United States Patent [19]

Ganse

[11] Patent Number: 5,067,009
[45] Date of Patent: Nov. 19, 1991

[54] APPARATUS FOR RECORDING AND/OR REPRODUCING A COMPONENT VIDEO SIGNAL HAVING A LUMINANCE SIGNAL OF A WIDE FREQUENCY BAND AND A CHROMA SIGNAL IN A BAND BELOW THE HIGH END OF THE LUMINANCE SIGNAL BAND AND WITHIN THE LATTER

[75] Inventor: Shigeru Ganse, Kanagawa, Japan
[73] Assignee: Sony Corporation, Tokyo, Japan
[21] Appl. No.: 503,768
[22] Filed: Apr. 3, 1990

[30] Foreign Application Priority Data

Apr. 6, 1989 [JP] Japan .................... 1-88317

[51] Int. Cl.$^5$ ............................ H04N 9/85
[52] U.S. Cl. ...................... 358/12; 358/16; 358/31
[58] Field of Search ............ 358/12, 16, 31

[56] References Cited

U.S. PATENT DOCUMENTS 4,543,598 9/1985 Oliphant .................. 358/11

FOREIGN PATENT DOCUMENTS 2126822 3/1984 United Kingdom ........ 358/12

Primary Examiner—James J. Groody
Assistant Examiner—Kim Yen Vu
Attorney, Agent, or Firm—Alvin Sinderbrand; William S. Frommer

[57] ABSTRACT

In an apparatus for recording and/or reproducing a component video signal having a luminance signal of a wide frequency band so as to be reproducible for obtaining a picture of high resolution and a chroma signal in a chroma band included in the frequency band of the luminance signal substantially below the high end of the latter, a recording signal processing circuit separates from the luminance signal a slant direction luminance signal in a frequency band that includes, and extends substantially above the chroma band, whereupon the luminance signal is suppressed by the slant direction luminance signal and a component of the slant direction luminance signal in the chroma band is frequency-converted to a higher band and is frequency interleaved with the suppressed luminance singal. The chroma signal is frequency interleaved with the suppressed luminance signal and is then added to the latter and to the frequency-converted slant direction luminance signal for forming the video signal which is recorded. In the reproducing mode, a circuit for processing the reproduced video signal separates therefrom the chroma signal, the frequency-converted slant direction luminance signal and the suppressed luminance signal, whereupon the separated frequency converted slant direction luminance signal is frequency-reconverted back to the chroma band and into frequency interleaved relation with the suppressed luminance signal, and the reconverted slant direction luminance signal and the separated suppressed luminance signal are added to provide a luminance signal which, with the separated chroma signal, forms a reproduced component video signal.

17 Claims, 4 Drawing Sheets

APPARATUS FOR RECORDING AND/OR REPRODUCING A COMPONENT VIDEO SIGNAL HAVING A LUMINANCE SIGNAL OF A WIDE FREQUENCY BAND AND A CHROMA SIGNAL IN A BAND BELOW THE HIGH END OF THE LUMINANCE SIGNAL BAND AND WITHIN THE LATTER

BACKGROUND OF THE INVENTION

1. Field of the Invention

The present invention relates generally to video signal processing apparatus and, more particularly is directed to apparatus for processing a video signal when recording the same and when reproducing the video signal, as in a video disc player.

2. Description of the Prior Art

In the prior art, a standard video signal, for example, according to the NTSC system, and which will be hereinafter referred to as a composite video signal, is frequency modulated and then recorded on a video disc. As shown in FIG. 1, in a video diso player 1 for reproducing such standard video signal recorded on a video disc, an optical pick-up (not shown) reproduces the frequency-modulated composite video signal which is then frequency-demodulated in a circuit 4. A component of the demodulated composite video signal $S_{STV}$ situated in a chroma band is then extracted from the demodulated composite video signal by a bandpass filter circuit 5, and the resulting extracted signal component is processed by a comb-type filter circuit 6 to provide a chroma signal $S_C$ separated from the composite video signal. Further, the separated chroma signal $S_C$ is subtracted from the composite video signal $S_{STV}$ in a subtracting circuit 7 which thereby provides a separated luminance signal $S_Y$.

In a video apparatus, such as, a camera or image pick-up apparatus or the like, an imager signal is frequently not converted to a composite video signal, but rather is outputted as a component video signal, that is, as separated luminance and chrominance signals. In the case of a component video signal, as contrasted with the usual composite video signal, a luminance signal of wide frequency band can be provided for obtaining a displayed picture therefrom of high resolution. In other words, if a component video signal including a luminance signal of wide frequency band is recorded on a video disk, then a picture of high resolution or image quality may be reproduced by a video disc player. However, when recording a component video signal including a luminance signal of wide frequency band on a video disc, it is necessary to establish compatibility between such socalled high resolution video disc and a conventional or prior-art video disc on which a composite video signal is recorded. To this end, it has been proposed that, as shown on FIG. 2, a luminance signal $S_{YH}$ of wide frequency band and a chroma signal $S_{CH}$, which form a component video signal, be added by an adding circuit 8 for providing a signal $S_{REC}$ which is then recorded on the video disc. When such simple proposal is followed, interference between the luminance signal $S_{YH}$ and the chroma signal $S_{CH}$ can not be avoided so that problems, such as, cross-color, dot interference and the like do occur and the quality of the resulting displayed picture is deteriorated.

In order to solve the foregoing problems, it has been proposed, for example, as shown on FIG. 3, to superimpose a chroma signal $S_{CL}$ upon a relatively wide band luminance signal $S_{YH}$ through the use of comb-type filter circuits 9 and 10. More specifically, the chroma signal $S_{CL}$, which is initially limited to a band similar to the frequency band of the chroma in the standard composite video signal, is fed to the comb-type filter circuit 9 in which signal components having frequencies $(n-1) f_H, n f_H, (n+1) f_H, \ldots$ are suppressed so as to provide a chroma signal $S_{CK}$ having a comb-like frequency characteristic as shown in full lines on FIG. 4, and wherein $f_H$ represents the horizontal synchronizing frequency.

The wide band luminance signal $S_{YH}$ is supplied to a band-pass filter circuit 11 which has a pass-band equal to the frequency band of the chroma signal $S_{CL}$, and which is hereinafter referred to as the "chroma band". The component of the luminance signal $S_{YH}$ in the chroma band, that is, the component of the luminance signal $S_{YH}$ passing through the band-pass filter circuit 11, is supplied to the comb-type filter circuit 10 which has the same characteristic as the comb-type filter circuit 9. A subtracting circuit 12 subtracts the output of the comb-type filter circuit 10 from the luminance signal $S_{YH}$, and thereby suppresses a signal component of the frequencies $(n-1/2)f_H (n+1/2) f_H \ldots$ within the chroma band of the luminance signal $S_{YH}$. Therefore, at the output of the subtracting circuit 12, there is obtained a luminance signal $S_{YK}$ which is frequency-interleaved in respect to the chroma signal $S_{CK}$, and which is represented by the dotted line on FIG. 4. When such luminance signal $S_{YK}$ and the chroma signal $S_{CK}$ are added in an adding circuit 13, there is obtained, as the output from the adding circuit 13, a video signal $S_{ADD}$ having a frequency characteristic corresponding with that of the standard composite video signal in the frequency band below the chroma band, and which contains luminance information in a frequency band above the chroma band.

Since, the prior art video disc player 1 (FIG. 1) is arranged to process the signal component in the band lower than the chroma band, such player can be employed for playback of a video disc on which the video signal $S_{ADD}$ has been recorded rather than the standard composite video signal $S_{STV}$ (FIG. 1). Thus, deterioration of the quality of the displayed picture can be avoided and the compatibility of a video disc recorded with the video signal $S_{ADD}$, that is, a signal which includes a wide band luminance signal, with the video disc player 1 according to the prior art can be established. Further, if the video disc recorded with the video signal $S_{ADD}$ is reproduced on a video disc player intended for exclusive use therewith so as to reproduce luminance information in the frequency band higher than the chroma band, it is possible to improve the resolution of the resulting displayed picture, as compared with the picture obtained from the standard composite video signal.

However, in the signal processing operation described above with reference to FIG. 3, a signal component of the luminance signal $S_{YK}$ is suppressed by the operation of the bandpass filter 11, the comb-type filter circuit 10 and the subtracting circuit 12 so that the luminance signal $S_{YK}$ is frequency-interleaved with the chroma signal $S_{CK}$ in the signal $S_{ADD}$. Therefore, luminance information in the oblique or slant direction is dropped-out of the video signal $S_{ADD}$ within the chroma band. As a result, even though the luminance signal is extended to a high frequency band, the resolution of the displayed picture will not be greatly enhanced from the visual standpoint. In other words, although a component video signal including a wide band luminance signal is recorded, it is difficult to obtain a picture whose image quality is improved to the extent that would be realized by effectively utilizing the characteristics of the component video signal.

OBJECTS AND SUMMARY OF THE INVENTION

Accordingly, it is an object of the present invention to provide a video signal processing apparatus which can eliminate the above noted problems associated with the prior art.

More specifically, it is an object of the present invention to provide a component video signal processing apparatus for use in recording and/or reproducing a video signal, for example, on a video disc, and by which a visual image of high quality can be reproduced while maintaining compatibility of the resulting video disc with video disc players intended for the playback of a standard composite video signal.

In accordance with an aspect of this invention, in an apparatus for recording a component video signal having a wide band luminance signal, so as to be reproducible for obtaining a picture of high resolution, and a chroma signal in a chroma band included within the wide frequency band of the luminance signal and being substantially below the high end thereof; a signal processing circuit comprises means receiving the luminance signal for separating therefrom a slant direction luminance signal formed of slant direction luminance information in a frequency band that includes and extends substantially above the chroma band, and for suppressing the luminance signal by the slant direction luminance signal so as to obtain a suppressed luminance signal; frequency-converting means for frequency-converting a component of the slant direction luminance signal in the chroma band to a frequency-converted slant direction luminance signal which is frequency-interleaved with the suppressed luminance signal and which is in a frequency band higher than the chroma band; means for frequency interleaving the chroma signal with the suppressed luminance signal; and means for adding the suppressed luminance signal, the frequency-converted slant direction luminance signal and the chrominance signal interleaved with the suppressed luminance signal for providing the signal to be recorded.

In accordance with another aspect of this invention, in an apparatus for reproducing a recorded video signal which, for example, has been recorded as above so as to have a chroma signal in a chroma band, a suppressed luminance signal frequency interleaved with the chroma signal and in which a luminance signal is suppressed by a slant direction luminance signal in a frequency band that includes and extends substantially above the chroma band, and a frequency- converted slant direction luminance signal frequency interleaved with the suppressed luminance signal and which is constituted by a component of the slant direction luminance signal in the chroma band frequency-converted to a higher band; a circuit for processing the recorded video signal when reproduced comprises separating means receiving the reproduced video signal for separating therefrom the chroma signal, the frequency-converted slant direction luminance signal and the suppressed luminance signal; frequency-converting means for reconverting the separated frequency-converted slant direction luminance signal to the chroma band and in frequency-interleaved relation with the suppressed luminance signal; and adding means for adding the reconverted slant direction luminance signal and the separated suppressed luminance signal for providing therefrom a luminance signal whose slant direction luminance information is dropped-out only in a frequency band above the chroma band and which forms, with the separated chroma signal, a reproduced component video signal.

The above and other objects, features and advantages of the present invention, will be apparent in the following detailed description of preferred embodiments of the invention which is to be read in conjunction with the accompanying drawings, in which corresponding parts are identified by the same reference numerals in the several views.

DETAILED DESCRIPTION OF PREFERRED EMBODIMENTS

Figure 1:
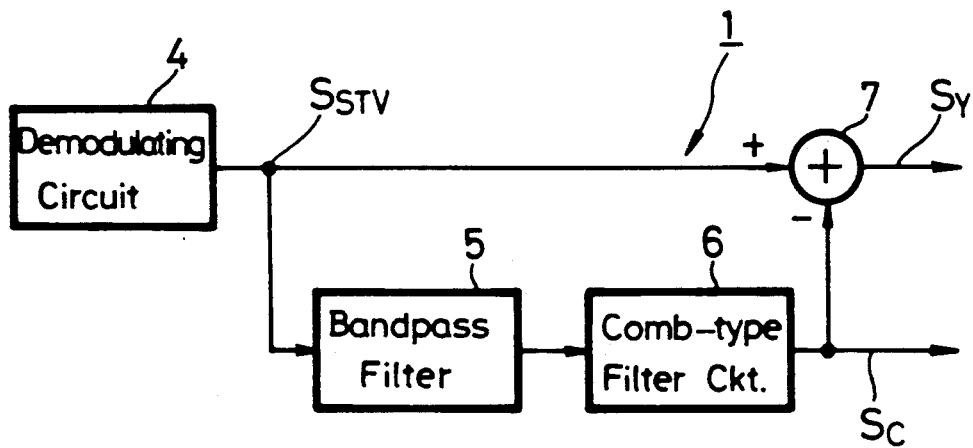
FIG. 1 is a block diagram showing a reproduced signal processing circuit of a video disc player according to the prior art.
Figure 2:
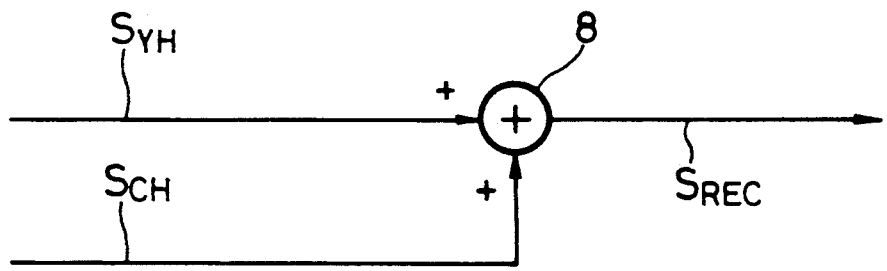
FIGS. 2 and 3 are block diagrams showing respective circuits according to the prior art for processing a component video signal comprised of separately received luminance and chroma signals in preparation for the recording thereof.
Figure 3:
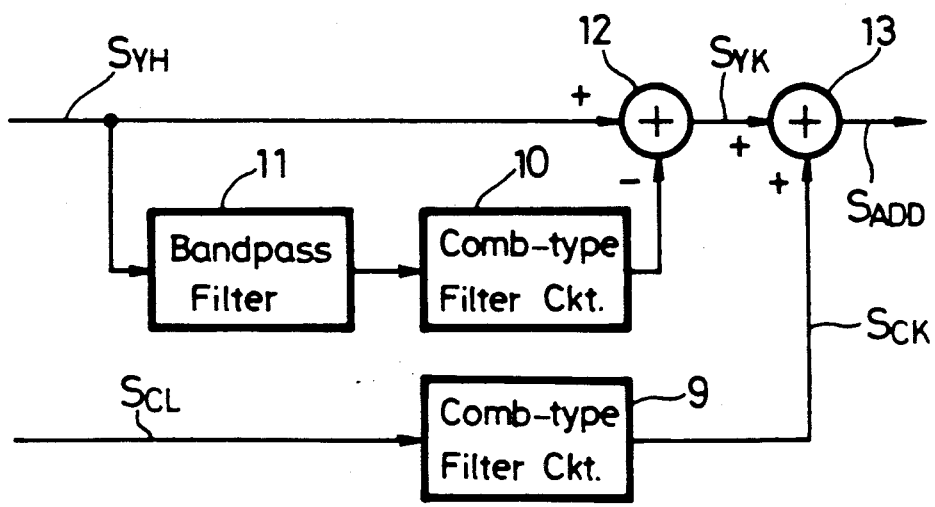
Figure 4:
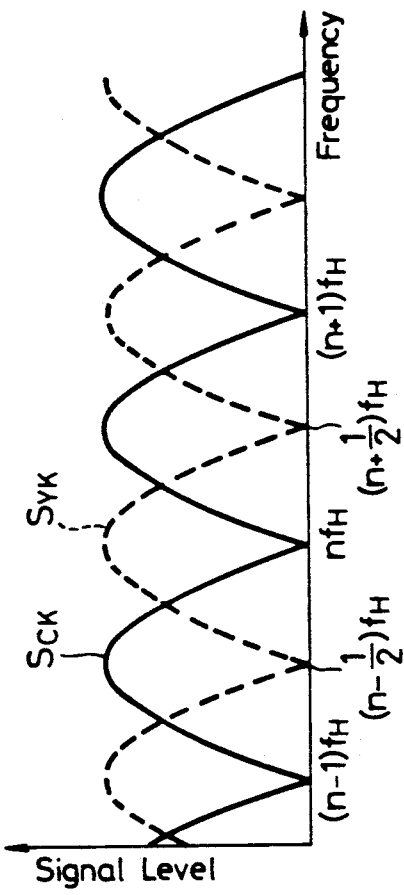
FIG. 4 is a diagram showing frequency spectra to which reference will be made in explaining the operation of the signal processing circuit of FIG. 3.
Figure 5:
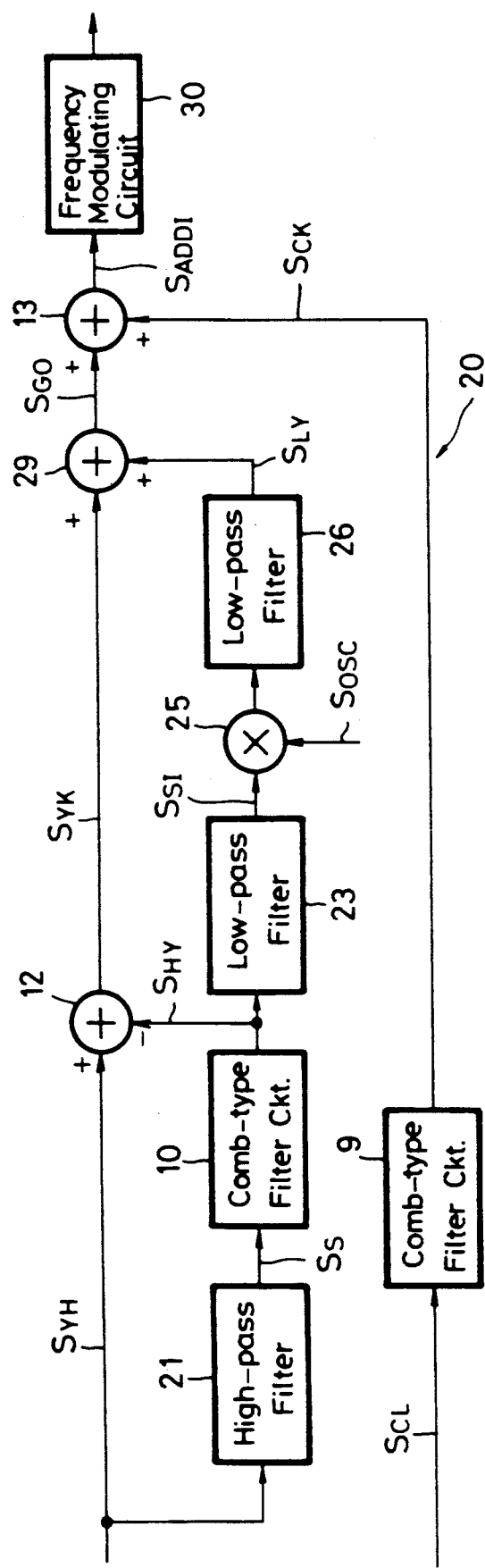
FIG. 5 is a block diagram of a signal processing circuit according to an embodiment of this invention and which is used in recording a component video signal having a wide band luminance signal.
Figure 6A:
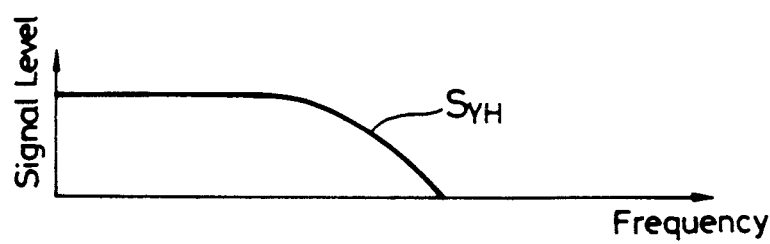
FIGS. 6A-6H are diagrams showing frequency spectra to which reference will be made in explaining the operation of the circuit of FIG. 5 in processing a component video signal to be recorded.
Figure 6B:
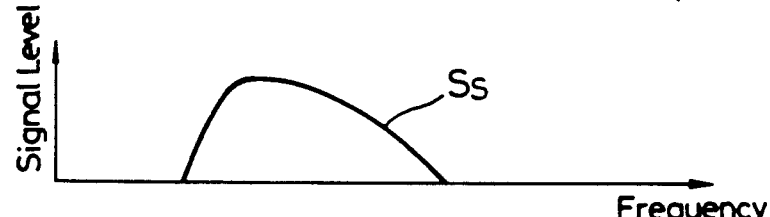

Referring to the drawings in detail, and initially to FIG. 5 thereof in which parts corresponding to those described above with reference to FIG. 3 are identified by the same reference numerals and letters, it will be seen that, in a circuit 20 according to an embodiment of the present invention for processing a component video signal prior to its recording on a video disc (not shown), a luminance signal $S_{YH}$ (FIG. 6A) having a wide frequency band, for example, extending to 7 MHz, is supplied to a high-pass filter circuit (HPF) 21. The frequency of 7 MHz at the upper end of the frequency band of the luminance signal $S_{YH}$ is the maximum frequency that can be recorded on, or reproduced from a video disc. The HPF 21 has a cut-off frequency substantially corresponding to the frequency at the low end of the frequency band of the chroma signal $S_{CL}$ of the component video signal to be recorded. Thus, the HPF 21 extracts from the luminance signal $S_{YH}$ a signal component $S_S$ (FIG. 6B) which includes the frequencies of the chroma band and extends thereabove to the upper end of the wide band luminance signal. Such component $S_S$ of the luminance signal $S_{YH}$ is supplied to a comb-type filter circuit 10 which has a comb-tooth characteristic similar to that of the comb-type filter circuit 10 of FIG. 3, and in which the level of the signal component $S_S$ is suppressed at frequencies spaced apart by $f_H$ so as to provide a signal $S_{HY}$ (FIG. 6D) hereinafter referred to as a slant direction luminance signal.

Figure 6C:
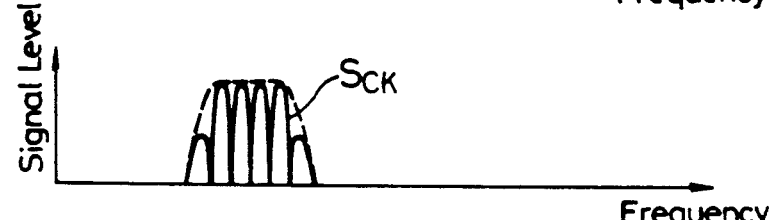
Figure 6D:
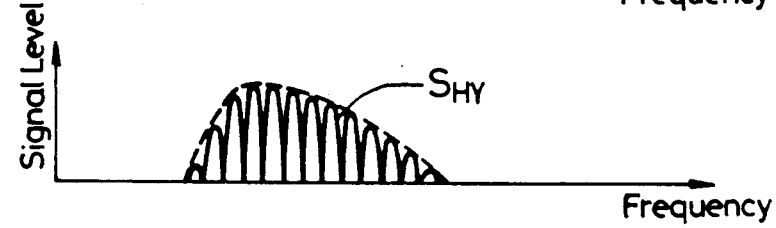
Figure 6E:
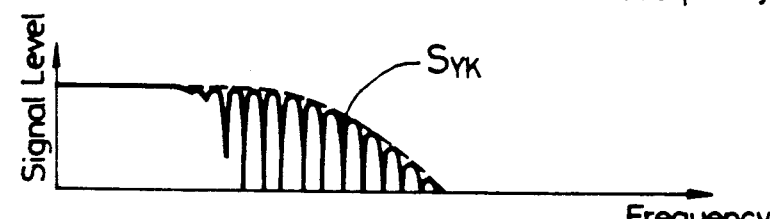

The chroma signal $S_{CL}$ of the component video signal supplied to the processing circuit of FIG. 5 is applied to a comb-type filter circuit 9 having a comb-tooth characteristic similar to that of the comb-type filter circuit 10 so that the chroma signal $S_{CK}$ at the output of the filter circuit 9 has the characteristic shown on FIG. 6C. The slant direction luminance signal $S_{HY}$ derived from comb-type filter circuit 10 is subtracted from the wide band luminance signal $S_{YH}$ in a subtracting circuit 12 so that the luminance signal $S_{YH}$ is suppressed by the slant direction luminance signal $S_{HY}$ over the frequency band of the latter. In other words, the suppressed luminance signal $S_{YK}$ (FIG. 6E) obtained at the output of the subtracting circuit 12 is suppressed so as to be in frequency-interleaved relation with the chroma signal $S_{CK}$ obtained from the comb-type filter circuit 9.

It will be appreciated that, in the circuit arrangement as described above with reference to FIG. 5, the wide band luminance signal $S_{YH}$ is separated to provide a signal component, that is, the slant direction luminance signal $S_{HY}$, having a frequency band extending from the lower end of the chroma band substantially to the upper end of the band of luminance signal $S_{YH}$, that is, to a frequency substantially higher than the upper end of the chroma band, and which contains the luminance information in the slant direction, and also to provide a signal component, that is, the suppressed luminance signal $S_{YK}$, having a frequency band corresponding to that of the wide band luminance signal $S_{YH}$ so as to extend substantially above the chroma band, but which has no luminance information in the slant direction over the range of frequencies corresponding to the chroma band and there above to the high end of the frequency band of the luminance signal $S_{YH}$. It will further be appreciated that, in the suppressed luminance signal $S_{YK}$ (FIG. 6E), all of the luminance information is retained in the frequency band below the chroma band similarly to the arrangement in a composite video signal.

Figure 6F:
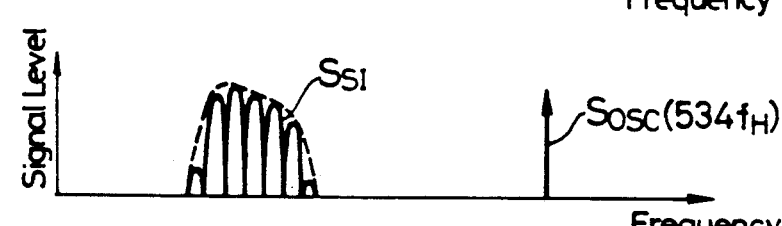
Figure 6G:
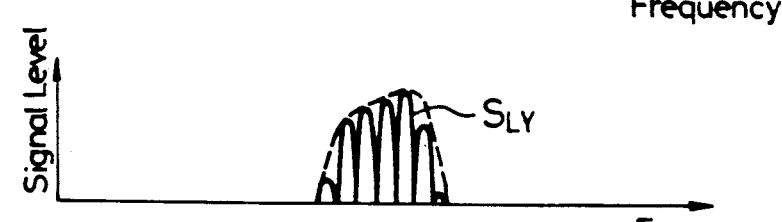

Continuing with the signal processing circuit 20 of FIG. 5, it will be seen that the slant direction luminance signal $S_{HY}$ is also applied to a low-pass filter circuit (LPF) 23 having a cut-off frequency substantially at the upper end of the chroma band so as to extract from the signal $S_{HY}$ a signal component $S_{SI}$ (FIG. 6F) having a frequency band substantially equal to that of the chroma band, and which is hereinafter referred to as a low frequency slant direction luminance signal. The low frequency slant direction luminance signal $S_{SI}$ is supplied to a multiplier circuit 25 in which it is multiplied by a reference signal $S_{OSC}$ which, for example, has a frequency of 534 $f_H$. The output of the multiplier circuit 25 is supplied to a low-pass filter circuit 26 having a cut-off frequency at the upper end of the wide band luminance signal $S_{YH}$, for example, a cut-off frequency of 7 MHz. The multiplier circuit 25 and the LPF 26 cooperate to provide, at the output of LPF 26, a frequency-converted slant direction luminance signal $S_{LY}$ (FIG. 6G) in a frequency band higher than the chroma band which is situated between the cut-off frequencies of the HPF 21 and the LPF 23, respectively.

By selecting the frequency of the reference signal $S_{OSC}$ to be 534 $f_H$, the component of the low frequency slant direction luminance signal $S_{SI}$ having frequencies lower than the central frequency thereof is frequency-converted so as to correspond to the component of the frequency-converted slant direction luminance signal $S_{LY}$ having frequencies higher than the central frequency of the latter. Thus, as is apparent from a comparison of FIGS. 6F and 6G, the signal level of the frequency-converted slant direction luminance signal $S_{LY}$ in the lower frequency portion thereof is lower than the level of the signal $S_{LY}$ in the higher frequency portion of the latter.

Further, by selecting the frequency of the reference signal $S_{OSC}$ to be 534 $f_H$, the frequency-converted slant direction luminance signal $S_{LY}$ has a comb-like frequency characteristic in which the signal level is suppressed at frequencies based on $(n+1/2) f_H$ and which are spaced apart by the frequency $f_H$, similarly to the chroma signal $S_{CK}$. Consequently, the frequency-converted slant direction luminance signal $S_{LY}$ is frequency-interleaved with the suppressed luminance signal $S_{YK}$ derived from the adding circuit 12.

Therefore, when the suppressed luminance signal $S_{YK}$ and the frequency-converted slant direction luminance signal $S_{LY}$ are added by an adding circuit 29, the resulting mixed luminance signal $S_{GO}$ obtained from the output of the adding circuit 29 has a frequency characteristic which is the same as that of the standard composite video signal in the frequency band below the upper end of the chroma band.

It will be seen that the mixed luminance signal $S_{GO}$ includes, in the frequency band lower than the chroma band, luminance information in the lateral direction and in the slant direction of the suppressed luminance signal $S_{YK}$, and luminance information in the slant direction for frequencies in the chroma band and also in the lateral direction for frequencies higher than the chroma band and which are contributed by the frequency converted slant direction luminance signal $S_{LY}$ and the suppressed luminance signal $S_{YK}$, respectively.

As described above, in the present embodiment, the slant direction luminance information for the chroma band is frequency-converted to a relatively higher band, for example, as in the frequency-converted slant direction luminance signal $S_{LY}$, so that the luminance information suppressed or dropped-out of the suppressed luminance signal in the chroma band in order to maintain compatibility with the standard composite video signal is converted to a frequency band above the chroma band so as to be recordable on a video disc in which a component video signal having its luminance signal band up to 7 MHz is to be recorded.

It is known that luminance information having a low frequency can be visually sensed more easily than luminance information having a higher frequency. The present invention takes advantage of the foregoing phenomenon by retaining the slant direction luminance information for the chroma band, which is relatively low, and frequency-converting the corresponding low frequency slant direction luminance signal $S_{SI}$ so as to form the frequency-converted slant direction luminance signal $S_{LY}$ which is recorded in place of the slant direction luminance information for the frequency band higher than the chroma band. By reason of the foregoing, when a component video signal recorded with a wide-band luminance signal in accordance with the present invention is reproduced, the resolution of the resulting picture can be improved to the full extent that is possible by reason of the increased frequency band that can be recorded and reproduced on the video disc.

Figure 6H:
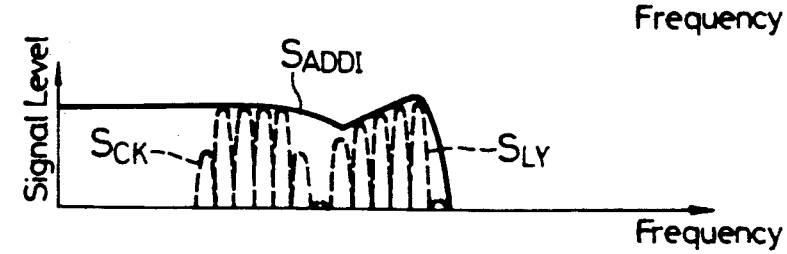

After the frequency-converted slant direction luminance signal $S_{LY}$ and the suppressed luminance signal $S_{YK}$ have been added together in the adding circuit 29, the resulting mixed luminance signal $S_{GO}$ is added to the chroma signal $S_{CK}$ in the adding circuit 13 so as to provide an added signal $S_{ADD1}$ (FIG. 6H). Then, the added signal $S_{ADD1}$ is supplied to a frequency modulating circuit 30 and the resulting frequency modulated signal is supplied to a recording circuit (not shown) by which the signal is recorded on a mother disc or the like. It will be appreciated that, when the mixed luminance signal $S_{GO}$ is added to the chroma signal $S_{CK}$ in the adding circuit 13, the signal level of the frequency-converted slant direction luminance signal $S_{LY}$, at its relatively lower frequency portion, is relatively low so as to avoid mutual interference with the adjacent added chroma signal $S_{CK}$ and thereby permit a video signal of enhanced image quality to be obtained.

It will be apparent that a mother disc produced as described above can be conventionally duplicated to provide so called high-resolution video discs therefrom which, when used with a corresponding video disc player designed to take advantage of its high-resolution qualities, can make possible the display of a picture of high image quality, while being compatible with conventional video disc players according to the prior art, that is, intended for use with video discs recorded with a composite video signal. When a high-resolution video disc recorded with the added signal $S_{ADD1}$ according to this invention is used with a prior art video disc player, the frequency band above the chroma band is not reproduced so that the frequency-converted slant direction luminance signal $S_{LY}$ is omitted from the reproduced video signal which is thereby made similar to a reproduced composite video signal.

In the embodiment of this invention described above with reference to FIG. 5, it will be seen that the comb-type filter circuit 10, the subtracting circuit 12 and the high-pass filter circuit 21 constitute separating means for separating the luminance signal $S_{YH}$ into the slant direction luminance signal $S_{HY}$ formed of slant direction luminance information in a frequency band that includes and extends substantially above the chroma band, and into the suppressed luminance signal $S_{YK}$ which results from subtracting the slant direction luminance signal $S_{HY}$ from the luminance signal $S_{YH}$. The low-pass filter circuits 23 and 26 an the multiplier circuit 25 constitute frequency-converting means by which a component of the slant direction luminance signal $S_{HY}$ limited to the chroma band is frequency converted to a frequency band higher than the chroma band and is frequency-interleaved with the suppressed luminance signal $S_{YK}$. Finally, in the embodiment of FIG. 5, the adding circuits 13 and 29 constitute adding means for adding together the suppressed luminance signal $S_{YK}$, the frequency-converted slant direction luminance signal $S_{LY}$ and the chroma signal $S_{CK}$ frequency-interleaved with the suppressed luminance signal $S_{YK}$, and thereby providing the added signal $S_{ADD1}$ to be recorded.

Figure 7:
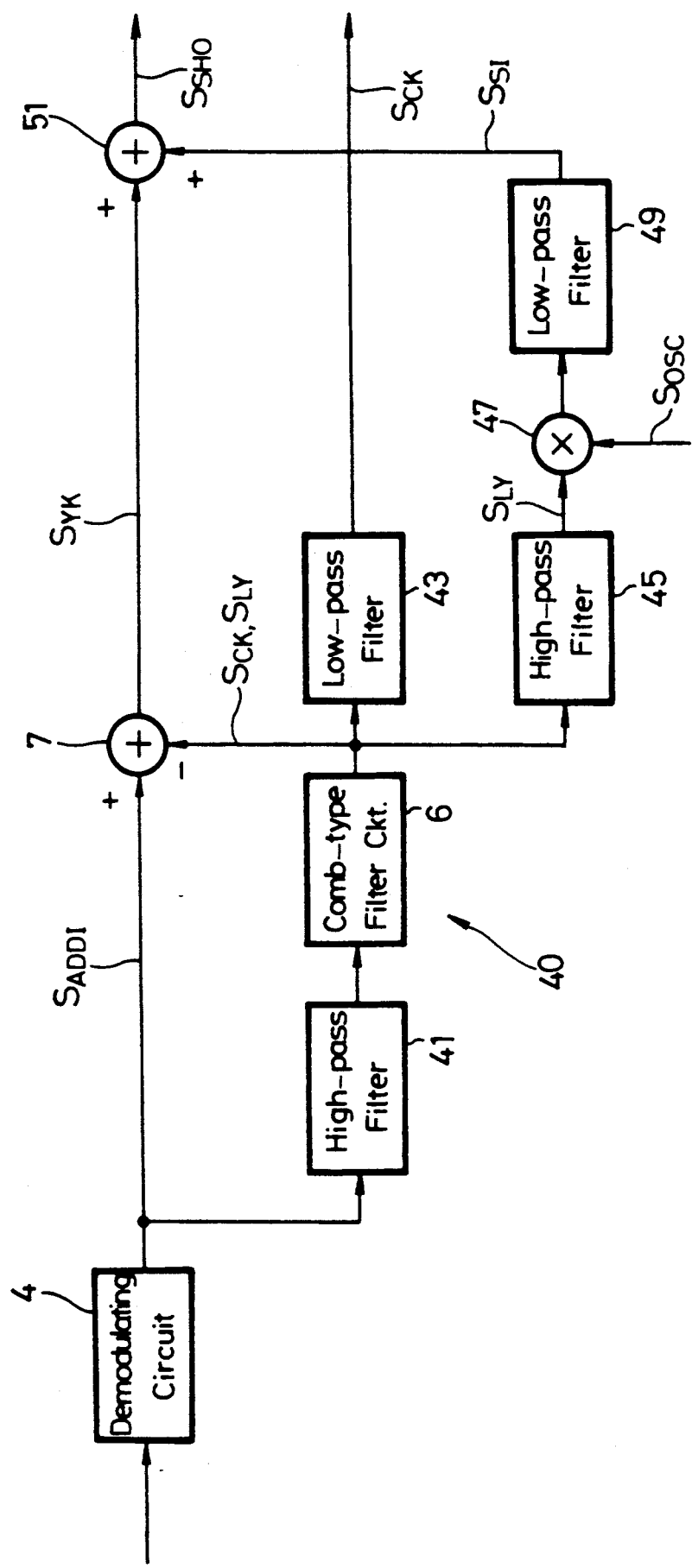
FIG. 7 is a block diagram showing a signal processing circuit according to an embodiment of this invention for use in a recording or playback operation of a video disc player which can be used either with a standard video disc recorded with a composite video signal or with a video disc recorded with a component video signal having a wide band luminance signal and which is recorded after processing by the circuit of FIG. 5.

Referring now to FIG. 7, it will be seen that a video disc player according to an embodiment of this invention is there shown to include a signal processing circuit 40 which adapts the video disc player for the playback of a prior art video disc recorded with a standard composite video signal, or for the playback of a high-resolution video disc recorded, as previously described with reference to FIG. 5, with a component video signal having a wide band luminance signal. More specifically, in a video disc player having the signal processing circuit 40 illustrated in FIG. 7, a video disc is rotated by a suitable spindle motor (not shown), and the video signal recorded on the rotated video disc is reproduced, for example, by an optical pick-up or head (not shown) so as to provide a reproduced video signal which is supplied to a demodulating circuit 4. If a video disc according to the prior art, that is, recorded with a composite video signal, is being reproduced, the demodulating circuit 4 derives such composite video signal from the reproduced signal. On the other hand, when a high-resolution video disc is being reproduced, the demodulating circuit 4 derives therefrom the added signal $S_{ADD1}$ comprised of the mixed luminance signal $S_{GO}$ and the chroma signal $S_{CK}$. A high-pass filter circuit (HPF) 41 has a cut-off frequency substantially corresponding to the lower end of the chroma band so as to extract from the output of the demodulating circuit 4 a signal component having a frequency band that includes the chroma band and extends substantially higher than the latter, for example, up to the limit of 7 MHz that can be recorded and reproduced on the video disc. Such extracted signal component is supplied from the HPF 41 to a comb-type filter circuit 6 which, when a prior art video disc is being reproduced, derives a chroma signal from the output of the HPF 41. On the other hand, when a high-resolution video disc is being reproduced, the comb-type filter circuit 6 derives from the output of the HPF 41 both the chroma signal $S_{CK}$ and the frequency-converted slant direction luminance signal $S_{LY}$ having a frequency higher than the chroma band, but which contains slant direction luminance information from the chroma band.

The output of the comb-type filter circuit 6 is supplied to a subtracting circuit 7 so as to be subtracted by the latter from the output of the demodulating circuit 4. If a prior-art video disc is being reproduced, the chroma signal extracted by the filter circuit 6 is subtracted from the reproduced composite video signal so as to provide a luminance signal at the output of the subtracting circuit 7. However, if a high-resolution video disc is being reproduced, the chroma signal $S_{CK}$ and the frequency-converted slant direction luminance signal $S_{LY}$ derived by the filter circuit 6 are subtracted from the reproduced added signal $S_{ADD1}$ so as to provide, at the output of the subtracting circuit 7, the suppressed luminance signal $S_{YK}$ (FIG. 6E) from which the slant direction luminance signal is dropped-out in the frequency band that includes the chroma band and extends thereabove to the upper limit (7 MHz) of the luminance signal band.

The output of the comb-type filter circuit 6 is also supplied to a low-pass filter circuit (LPF) 43 which has a cut-off frequency substantially corresponding to the upper end of the chroma band so as to extract the chroma signal $S_{CK}$ from the output of the comb-type filter circuit 6. Thus, when a composite video signal recorded on a prior art video disc is reproduced, the luminance signal and the chroma signal can be separately obtained from the outputs of the subtracting circuit 7 and the LPF 43, respectively. When a high-resolution video disc is reproduced, the chroma signal $S_{CK}$ is obtained as the output of the LPF 43 separate from the frequency-converted slant direction luminance signal $S_{LY}$ which is then included therewith in the output of the comb-type filter circuit 6.

A high-pass filter circuit (HPF) 45 is also connected to the output of the comb-type filter circuit 6 and has a cut-off frequency substantially corresponding to the upper end of the chroma band. Accordingly, when a prior art video disc is being reproduced so that the output of the filter circuit 6 consists only of the chroma signal, no signal passes through the HPF 45. On the other hand, when a high-resolution video disc is being reproduced, the HPF 45 extracts the frequency-converted slant direction luminance signal $S_{LY}$ from the output of the comb-type filter circuit 6.

The frequency-converted slant direction luminance signal $S_{LY}$ appearing at the output of the HPF 45 is multiplied by a reference signal $S_{OSC}$ in a multiplier circuit 47 and the output of the latter is fed to a low-pass filter (LPF) 49 having a cut-off frequency substantially corresponding to the upper end of the chroma band. Thus, when a high-resolution video disc is being reproduced, the multiplier circuit 47 and the LPF 49 operate to reconvert the frequency-converted slant direction luminance signal $S_{LY}$ back to the original frequency band, that is, the chroma band, while interleaving the reconverted slant direction luminance signal $S_{SI}$ with the suppressed luminance signal $S_{YK}$ being then obtained from the output of the subtracting circuit 7. Thus, the output of the LPF 49 is the reconverted low frequency slant direction luminance signal $S_{SI}$ (FIG. 6F), that is, the reproduced slant direction luminance information of the chroma band. Such reproduced low frequency slant direction luminance signal $S_{S1}$ obtained from the LPF 49 is added to the suppressed luminance signal $S_{YK}$ by an adding circuit 51 to provide, at the output of the latter, a reproduced luminance signal $S_{SHO}$ in which slant direction luminance information is dropped-out or missing only in the frequency band higher than the chroma band.

Accordingly, when a video disc player having the signal processing circuit 40 according to the present invention is employed for playback or reproducing of a prior art video disc, the luminance signal and the chroma signal are readily separated from the reproduced composite video signal. On the other hand, when a high resolution video disc recorded in the manner previously described with reference to FIG. 5 is being reproduced, the signal processing circuit 40 makes it possible to obtain the chroma signal $S_{CK}$ and the wide band luminance signal $S_{SHO}$ having its resolution in the lateral direction extended to 7 MHz and resolution in the slant direction extended to the upper end of the chroma band.

It will be appreciated that, in the embodiment of the invention described with reference to FIG. 7, the comb-type filter circuit 6, the subtracting circuit 7, the HPFs 41 and 45 and the LPF 43 constitute separating means by which the reproduced added signal S is separated into the chroma signal $S_{CK}$, the frequency-converted slant direction luminance signal $S_{LY}$ and the suppressed luminance signal $S_{YK}$. Further, in the signal processing circuit 40, the multiplying circuit 47 and the LPF 49 constitute frequency-converting means for reconverting the separated frequency-converted slant direction luminance signal $S_{LY}$ back to the chroma band and in frequency-interleaved relation with the suppressed luminance signal $S_{YK}$. Finally, in the signal processing circuit 40, the adding circuit 51 adds the reconverted slant direction luminance signal $S_{S1}$ to the suppressed luminance signal $S_{YK}$ for providing the wide band luminance signal $S_{SHO}$, while the chroma signal $S_{CK}$ is separately provided from the LPF 43.

Since the slant direction luminance information in the chroma band is frequency-converted to a higher frequency band, that is, to the signal $S_{LY}$, for recording, and, upon reproducing, is frequency reconverted to the original frequency band, that is, back to the chroma band, the reproduced luminance signal $S_{SHO}$ contains all of the lateral and slant direction luminance information at least to the upper end of the chroma band, so that it is possible to reproduce a display picture of high image quality while providing a video disc player that is compatible with prior art video discs recorded with composite video signals.

In the specifically described embodiment of this invention, the band width of the slant direction luminance signal $S_{SI}$, and hence of the frequency-converted slant direction luminance signal $S_{LY}$, has been limited by the LPF 23 (FIG. 5). In other words, only that portion of the slant direction luminance signal $S_{HY}$ (FIG. 6D) in the chroma band constitutes the low-frequency slant direction luminance signal $S_{SI}$ which is then frequency-converted to form the frequency-converted slant direction luminance signal $S_{LY}$. However, the present invention is not thus limited. By way of example, the cut-off frequency of the LPF 23 may be selected to be higher than the upper end of the chroma band, or the LPF 23 may be omitted. In such case, the frequency-converted slant direction luminance signal $S_{LY}$ may extend further in the direction of the higher frequencies so that upon a reproducing operation, as previously described, the resolution in the slant direction can be improved and a picture of even higher image quality can be obtained.

Although the low-frequency slant direction luminance signal $S_{SI}$ has been frequency-converted by multiplying the same with the reference signal $S_{OSC}$ having the frequency 534 $f_H$, the frequency of the reference signal $S_{OSC}$ is not limited to that value, and can be freely changed so long as the frequency-converted slant direction luminance signal $S_{OSC}$ is provided with a comb-tooth characteristic similar to that of the chroma signal $S_{CK}$ and is frequency-interleaved with the suppressed luminance signal $S_{YK}$.

Further, although compatibility with the NTSC standard composite video signal has been established in the above described embodiments of the invention, it will be appreciated that the invention can be similarly applied to other situations, for example, to cases where compatibility with PAL or SECAM standard video signals is to be established.

Moreover, although, in the above described embodiment of the invention, the component video signal has been described as being recorded on, and reproduced from a video disc, it will also be appreciated that the invention may be readily applied to recording on other recording media, such as, magnetic tape or the like, and also to video signal processing apparatus for transmitting and receiving a component video signal or the like. Thus, a video signal processing apparatus embodying this invention may be provided with dual functions, that is, recording and reproducing or transmitting and receiving.

Having described preferred embodiments of the invention with reference to the accompanying drawings, it is to be understood that the invention is not limited to those precise embodiments, and that various changes

What is claimed is:

1. In an apparatus for recording a component video signal having a luminance signal of a relatively wide frequency band so as to reproducible for obtaining a picture of high resolution and a chroma signal in a chroma band included within said frequency band of the luminance signal and being substantially below the high end thereof, a signal processing circuit comprising:

means receiving said luminance signal for separating therefrom a slant direction luminance signal formed of slant direction luminance information in a frequency band that includes and extends substantially above said chroma band;

means for suppressing said luminance signal by said slant direction luminance signal so as to obtain a suppressed luminance signal;

frequency-converting means for frequency-converting a component of said slant direction luminance signal in said chroma band to a frequency-converted slant direction luminance signal which is frequency interleaved with said suppressed luminance signal and which is in a frequency band higher than said chroma band;

means for frequency interleaving said chroma signal with said suppressed luminance signal; and means for adding said suppressed luminance signal, said frequency-converted slant direction luminance signal and said chroma signal interleaved with the suppressed luminance signal so as to provide an added signal to be recorded.

2. In an apparatus for recording a component video signal having a luminance signal of a relatively wide frequency band so as to be reproducible for obtaining a picture of high resolution and a chroma signal in a chroma band included within said frequency band of the luminance signal and being substantially below the high end thereof, a signal processing circuit comprising:

means receiving said luminance signal for separating therefrom a slant direction luminance signal formed of slant direction luminance information in a frequency band that includes and extends substantially above said chroma band, said means for separating including high-pass filter means for passing said frequency band of said luminance signal that includes, and extends above said chroma band, and comb-type filter means acting on the output of said high-pass filter means;

means for suppressing said luminance signal by said slant direction luminance signal so as to obtain a suppressed luminance signal;

frequency-converting means for frequency-converting a component of said slant direction luminance signal in said chroma band to a frequency-converted slant direction luminance signal which is frequency interleaved with said suppressed luminance signal and which is in a frequency band higher than said chroma band;

means for frequency interleaving said chroma signal with said suppressed luminance signal; and means for adding said suppressed luminance signal, said frequency-converted slant direction luminance signal and said chroma signal interleaved with the suppressed luminance signal so as to provide an added signal to be recorded.

3. An apparatus according to claim 2; in which said means for suppressing said luminance signal includes subtracting means for subtracting an output of said comb-type filter means from said luminance signal of the component video signal.

4. An apparatus according to claim 3; in which said means for frequency interleaving said chroma signal with said suppressed luminance signal includes second comb-type filter means having a frequency characteristic substantially the same as a frequency characteristic of the first mentioned comb-type filter means.

5. An apparatus according to claim 4; in which each of said first and second comb-type filter means suppresses the level of the respective signal at frequencies that are spaced apart by a horizontal frequency of the component video signal.

6. An apparatus according to claim 3; in which said frequency-converting means includes low-pass filter means having a cut-off frequency corresponding substantially to the upper end of said chroma band so as to provide, as an output from said lowpass filter means, a frequency band of said slant direction luminance signal corresponding to said chroma band, and means multiplying said output from the low-pass filter means by a predetermined frequency for obtaining said frequency-converted slant direction luminance signal which is frequency interleaved with said suppressed luminance signal.

7. In an apparatus for reproducing a recorded video signal that includes a chroma signal in a chroma band, a suppressed luminance signal frequency interleaved with said chroma signal and in which a luminance signal is suppressed by a slant direction luminance signal in a frequency band that includes and extends substantially above said chroma band, and a frequency-converted slant direction luminance signal frequency-interleaved with respect to the suppressed luminance signal and which is constituted by a component of said slant direction luminance signal in said chroma band frequency-converted to a band higher than said chroma band, a circuit for processing said recorded video signal when reproduced, comprising:

separating means receiving the reproduced video signal for separating therefrom said chroma signal, said frequencyconverted slant direction luminance signal and said suppressed luminance signal;

frequency-converting means for reconverting the separated frequency-converted slant direction luminance signal to said chroma band and in frequency interleaved relation to said suppressed luminance signal; and adding means for adding the reconverted slant direction luminance signal and the separated suppressed luminance signal so as to provide therefrom a luminance signal whose slant direction luminance information is dropped-out only in a frequency band above said chroma band and which forms, with the separated chroma signal, a component video signal.

8. In an apparatus for reproducing a recorded video signal that includes a chroma band, a suppressed luminance signal frequency interleaved with said chroma signal and in which a luminance signal is suppressed by a slant direction luminance signal in a frequency band that includes and extends substantially above said chroma band, and a frequency-converted slant direction luminance signal frequency-interleaved with respect to the suppressed luminance signal and which is constituted by a component of said slant direction luminance signal in said chroma band frequency-converted to a band higher than said chroma band, a circuit for processing said recorded video signal when reproduced, comprising:

separating means receiving the reproduced video signal for separating therefrom said chroma signal, said frequency-converted slant direction luminance signal and said suppressed luminance signal, said separating means including high-pass filter means having a cut-off frequency substantially corresponding to the lower end of said chroma band, comb-type filter means receiving an output of said high-pass filter means for deriving therefrom said chroma signal and said frequencyconverted slant direction luminance signal, low-pass filter means receiving an output of said comb-type filter means and having a cut-off frequency substantially corresponding to the upper end of said chroma band for passing said chroma signal, and subtracting means for subtracting said output of the comb-type filter means from said reproduced video signal so as to provide said separated suppressed luminance signal;

frequency-converting means for reconverting the separated frequency-converted slant direction luminance signal to said chroma band and in frequency interleaved relation to said suppressed luminance signal; and adding means for adding the reconverted slant direction luminance signal and the separated suppressed luminance signal so as to provide therefrom a luminance signal whose slant direction luminance information is dropped-out only in a frequency band above said chroma band and which forms, with the separated chroma signal, a component video signal.

9. An apparatus according to claim 8; in which said frequency-converting means includes second high-pass filter means having a cut-off frequency approximately corresponding to the lower end of the frequency band of said separated frqeuencyconverted slant direction luminance signal, and means multiplying an output from said second high-pass filter means by a predetermined frequency for obtaining the separated frequencyconverted slant direction luminance signal reconverted to said chroma band.

10. In an apparatus for recording and/or reproducing a component video signal having a luminance signal of a relatively wide frequency band so as to be reproducible for obtaining a picture of high resolution and a chroma signal in a chroma band included within said frequency band of the luminance signal and being substantially below the high end thereof: the combination of a recording signal processing circuit comprising first separating means receiving said luminance signal for separating therefrom a slant direction luminance signal formed of slant direction luminance information in a frequency band that includes and extends substantially above said chroma band; means for suppressing said luminance signal by said slant direction luminance signal so as to obtain a suppressed luminance signal; first frequency-converting means for frequency-converting a component of said slant direction luminance signal in said chroma band to a frequency-converted slant direction luminance signal which is frequency interleaved with said suppressed luminance signal and which is in a frequency band higher than said chroma band; means for frequency interleaving said chroma signal with said suppressed luminance signal; and means for adding said suppressed luminance signal, said frequency-converted slant direction luminance signal and said chroma signal interleaved with the suppressed luminance signal so as to provide a video signal to be recorded; and a circuit for processing the recorded video signal when reproduced, comprising second separating means receiving the reproduced video signal for separating therefrom said chroma signal, said frequency-converted slant direction luminance signal and said suppressed luminance signal; second frequency-converting means for reconverting the separated frequency-converted slant direction luminance signal to said chroma band and in frequency interleaved relation to said suppressed luminance signal; and means for adding the reconverted slant direction luminance signal and the separated suppressed luminance signal so as to provide therefrom a luminance signal whose slant direction luminance information is dropped-out only in a frequency band above said chroma band and which forms, with the separated chroma signal, a reproduced component video signal.

11. In an apparatus for recording and/or reproducing a component video signal having a luminance signal of a relatively wide frequency band so as to be reproducible for obtaining a picture of high resolution and a chorma signal in a chroma band included within said frequency band of the luminance signal and being substantially below the high end thereof; the combination of a recording signal processing circuit comprising first separating means receiving said luminance signal for separating therefrom a slant direction luminance signal formed of slant direction luminance information in a frequency band that includes and extends substantially above said chroma band, said first separating means including high-pass filter means for passing said frequency band of said luminance signal that includes, and extends above said chroma band, and comb-type filter means acting on the output of said high-pass filter means; means for suppressing said luminance signal by said slant direction luminance signal so as to obtain a suppressed luminance signal; first frequency-converting means for frequency-converting a component of said slant direction luminance signal in said chroma band to a frequency-converted slant direction luminance signal which is frequency interleaved with said suppressed luminance signal and which is in a frequency band higher than said chroma band; means for frequency interleaving said chroma signal with said suppressed luminance signal; and means for adding said suppressed luminance signal, said frequency-converted slant direction luminance signal and said chroma signal interleaved with the suppressed luminance signal so as to provide a video signal to be recorded; and a circuit for processing the recorded video signal when reproduced, comprising second separating means receiving the reproduced video signal for separating therefrom said chroma signal, said frequency-converted slant direction luminance signal and said suppressed luminance signal; second frequency-converting means for reconverting the separated frequency-converted slant direction luminance signal to said chroma band and in frequency interleaved relation to said suppressed luminance signal; and means for adding the reconverted slant direction luminance signal and the separated suppressed luminance signal so as to provide therefrom a luminance signal whose slant direction luminance information is dropped-out only in a frequency band above said chroma band and which forms, with the separated chroma signal, a reproduced component video signal.

12. An apparatus according to claim 11; in which said means for suppressing said luminance signal includes subtracting means for subtracting an output of said comb-type filter means from said luminance signal of the input component video signal.

13. An apparatus according to claim 12; in which said means for frequency interleaving said chroma signal with said suppressed luminance signal includes second comb-type filter means having a frequency characteristic substantially the same as a frequency characteristic of the first mentioned comb-type filter means.

14. An apparatus according to claim 13; in which each of said first and second comb-type filter means suppresses the level of the respective signal at frequencies that are spaced apart by a horizontal frequency of the component video signal.

15. An apparatus according to claim 12; in which said first frequency-converting means includes low-pass filter means having a cut-off frequency corresponding substantially to the upper end of said chroma band so as to provide, as an output from said low-pass filter means, a frequency band of said slant direction luminance signal corresponding to said chroma band, and means multiplying said output from the low-pass filter means by a predetermined frequency for obtaining said frequency-converted slant direction luminance signal which is frequency interleaved with said suppressed luminance signal.

16. In an apparatus for recording and/or reproducing a component video signal having a luminance signal of a relatively wide frequency band so as to be reproducible for obtaining a picture of high resolution and a chroma signal in a chroma band included within and frequency band of the luminance signal and being substantially below the high end thereof; the combination of a recording signal processing circuit comprising first separating means receiving said luminance signal for separating therefrom a slant direction luminance signal formed of slant direction luminance information in a frequency band that includes and extends substantially above said chroma band; means for suppressing said luminance signal by said slant direction luminance signal so as to be obtain a suppressed luminance signal; first frequency-converting means for frequency-converting a component of said slant direction luminance signal in said chroma band to a frequency-converted slant direction luminance signal which is frequency interleaved with said suppressed luminance signal and which is in a frequency band higher than said chroma band; means for frequency interleaving said chroma signal with said suppressed luminance signal; and means for adding said suppressed luminance signal, said frequency-converted slant direction luminance signal and said chroma signal interleaved with the suppressed luminance signal so as to provide a video signal to be recorded; and a circuit for processing the recorded video signal when reproduced, comprising second separating means receiving the reproduced video signal for separating therefrom said chroma signal, said frequency-converted slant direction luminance signal and said suppressed luminance signal, said second separating means including high-pass filter means having a cutoff frequency substantially corresponding to the lower end of said chroma band, comb-type filter means receiving an output of said high-pass filter means for deriving therefrom said chroma signal and said frequency-converted slant direction luminance signal, low-pass filter means receiving an output of said combtype filter means and having a cut-off frequency substantially corresponding to the upper end of said chroma band for passing said chroma signal, and subtracting means for subtracting said output of the comb-type filter means from said reproduced video signal so as to provide said separated suppressed luminance signal; second frequency-converting means for reconverting the separated frequency-converted slant direction luminance signal to said chroma band and in frequency interleaved relation to said suppressed luminance signal; and means for adding the reconverted slant direction luminance signal and the separated suppressed luminance signal so as to provide therefrom a luminance signal whose slant direction luminance information is dropped-out only in a frequency band above said chroma band and which forms, with the separated chroma signal, a reproduced component video signal.

17. An apparatus according to claim 16; in which said second frequency-converting means includes second high-pass filter means having a cut-off frequency approximately corresponding to the lower end of the frequency band of said separated frequency-converted slant direction luminance signal, and means multiplying an output from said second high-pass filter means by a predetermined frequency for obtaining the separated frequency-converted slant direction luminance signal reconverted to said chroma band.

* * * * *